(No Model.)  2 Sheets—Sheet 1.
J. E. & E. W. BINGHAM.
HORSESHOE.
No. 383,694.  Patented May 29, 1888.
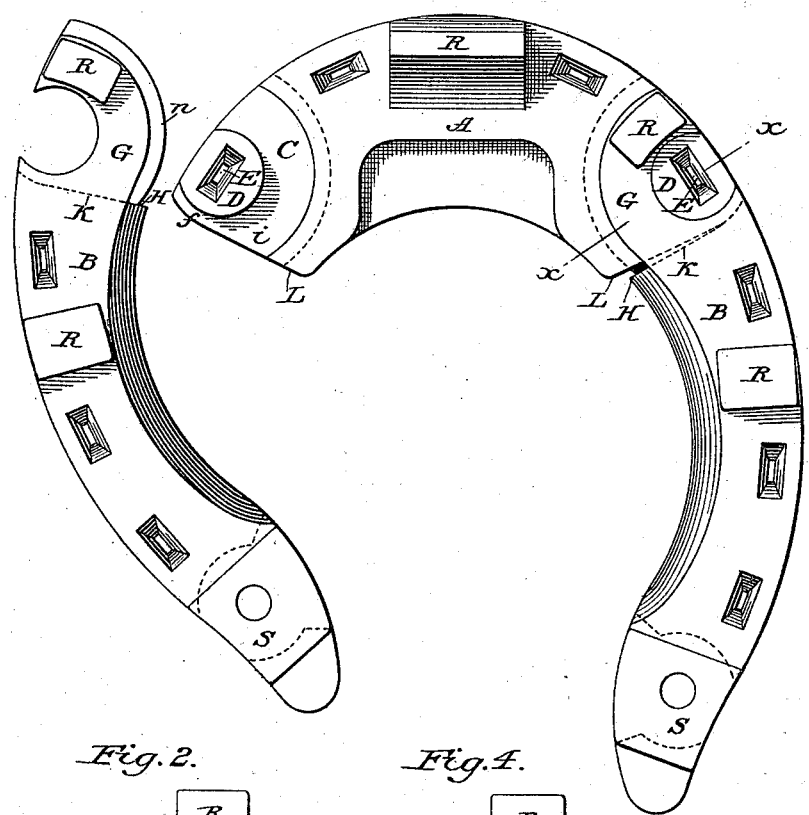
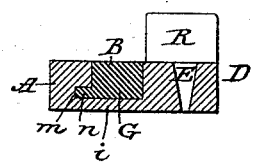
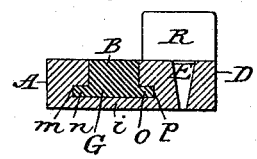
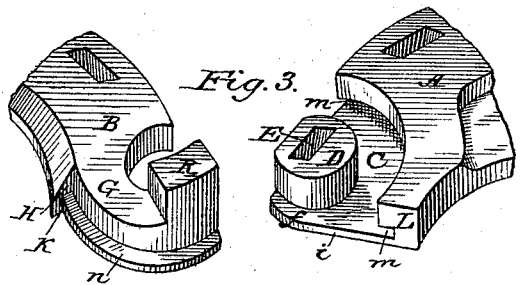
Attest:
A. N. Jesbera
James J. Kelly
Inventors:
John E. Bingham
and Edward W. Bingham
By Daniel A. Burr
Atty.
N. PETERS, Photo-Lithographer, Washington, D. C.

(No Model.) 2 Sheets—Sheet 2.

J. E. & E. W. BINGHAM.
HORSESHOE.

No. 383,694. Patented May 29, 1888.

Attest:
A. N. Jesbera
E. M. Watson.

Inventor:
John E. Bingham.
Edward W. Bingham.
By David A. Burr.
Atty.

UNITED STATES PATENT OFFICE.

JOHN E. BINGHAM, OF WALLA WALLA, WASHINGTON TERRITORY, AND EDWARD W. BINGHAM, OF PORTLAND, OREGON.

HORSESHOE.

SPECIFICATION forming part of Letters Patent No. 383,694, dated May 29, 1888.

Application filed November 5, 1887. Serial No. 254,352. (No model.)

*To all whom it may concern:*

Be it known that we, JOHN E. BINGHAM, of Walla Walla, in the county of Walla Walla and Territory of Washington, and EDWARD W. BINGHAM, of Portland, in the county of Multnomah and State of Oregon, have invented a new and useful Improvement in Sectional Horseshoes; and we do hereby declare that the following is a full and exact description thereof, reference being had to the accompanying drawings, and to the letters of reference marked thereon, making a part of this specification, in which—

Figure 5:
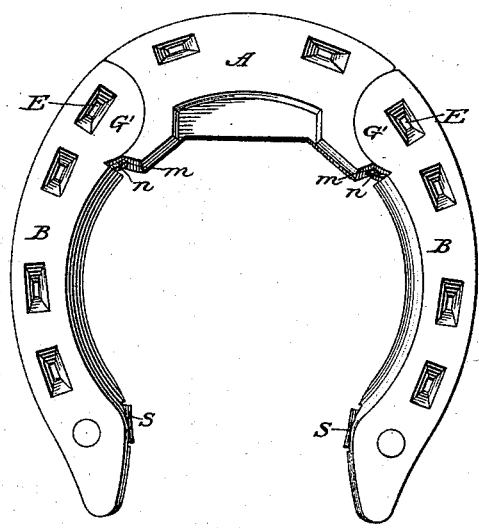
Figure 6:
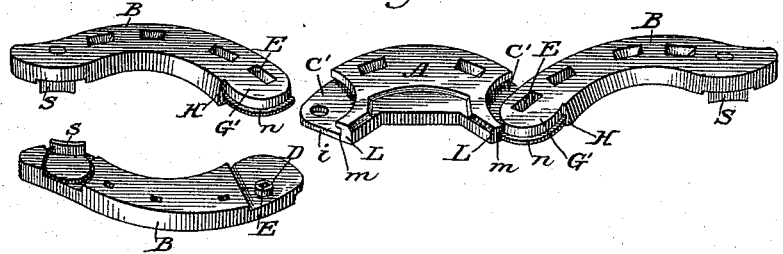

Figure 1 is a plan view of the ground side of our improved horseshoe, with one of its sections detached; Fig. 2, a transverse section in line $x\ x$ of Fig. 1; Fig. 3, a view in perspective of the end of the detached heel-section and of the counterpart end of the toe-section, with the ground side uppermost and the heel-section swung around in position to enter the recess in the toe-section; Fig. 4, a transverse section similar to that in Fig. 2, but illustrating a modification in the form of joint. Fig. 5 is a view in perspective of the shoe when made with the pivotal stud on each heel-section instead of on the toe-section; and Fig. 6 shows in perspective the toe-section of the shoe, Fig. 5, with one of its heel-sections turned in readiness for detachment and the other detached, and with a duplicate of said detached heel-section reversed to show its under face.

Our invention relates especially to that class of sectional horseshoes which are constructed by assembling and uniting suitable toe and heel parts selected from a number of interchangeable sections severally formed of varying dimensions and curvatures, so as to fit therewith any size or shape of hoof to be shod, in manner substantially as described in the Letters Patent granted to John E. Bingham, July 27, 1886, No. 346,350, although it is adapted to all forms of sectional or jointed horseshoes.

The object of said invention is to combine, with a simple secure lock-joint adapted to unite the heel and toe sections, means, as hereinafter described, whereby a nail may be passed directly through the joint to secure the shoe to the hoof at that point, so that the joint shall not interfere with the preservation of such regular intervals between the nails on each side of the foot as have been found by experience to be most useful in properly fastening the shoe.

Our invention consists in the combination, with the end of one section of the shoe, of a projecting pin or stud through which a nail-hole is pierced, and which is made to serve as a pivot upon which the proximate section of the shoe may turn, and also in the combination, with the perforated pin or stud and with a circular laterally-recessed shoulder in the end of the section carrying the same, of a counterpart perforated segmental tongue projecting from the end of the opposite section, the tongue being formed with a lateral flange to enter and interlock with the counterpart lateral recess in said shoulder, all as hereinafter more fully described.

In the accompanying drawings, A represents the toe-section, and B B the heel-sections, of our improved horseshoe.

At each end of the toe-section A a segmental or semicircular recess, C, is cut out or formed in the outer or ground face thereof about a central, circular, or cylindrical stud, D, left projecting near to the end of the outer margin of the section. This cylindrical stud is of a diameter large enough to permit of the formation of a nail-hole, E, through it. It is preferably removed far enough from the end of the section to leave an intervening ledge or flange, $f$, but is brought so close to the outer margin of the shoe as that its periphery coincides with said margin or is partly cut away thereby, as shown in Figs. 1 and 2. The opposite end of the appropriate heel-section B is made to terminate in a segmental tongue, G—a counterpart of the circular recess C—so formed as that when the two sections are brought into proper relation to form one side of the shoe the tongue G will wholly fill the recess C, (seen at right in Fig. 1,) while the shoulder H, at the inner end of the tongue upon the inner side of the section B, will strike against the opposite end, L, of the toe-section.

The depth of the recess C (and consequently the thickness of the tongue G) is preferably made to exceed one-half the thickness of the shoe, leaving but a thin plate, $i$, on the hoof side of the section to form the bottom of the recess. A recess, the counterpart of the plate

*i*, is formed in the tongue G, to receive said plate, and the inner wall, K, of the recess (see Fig. 2, and dotted lines, Fig. 1) abuts against the end of the plate when the tongue is fitted in the recess C, so that the shoulder H strikes the end L of the toe-section.

By making the tongue G flush with the ground-face of the shoe and of a thickness exceeding one-half that of the shoe the shoe may be worn down at the joint to an extreme thinness without affecting the strength of the said joint.

The stud D serves as a pivot for the joint, and when the segmental tongue G is fully inserted in the circular recess C it will so embrace the stud as to prevent a longitudinal or lateral separation of the two sections thus united.

To prevent the tongue G from being lifted out of the recess C, and to make a closer and more secure joint between the sections, the inner wall of the recess C opposite to the stud D is recessed laterally near the bottom thereof with a rectangular groove, *m*, extending the entire length thereof, and a counterpart flange, *n*, is formed upon the outer side of the tongue G, as clearly shown in Figs. 2 and 3, to fit in said recess. To unite the two parts of this flanged joint, the end of the flange *n* must be entered into the open end of the groove *m*, and the tongue G be turned about the stud D as a pivot, so as to slide into the recess C on a plane parallel with the bottom thereof, and the two sections united by said joint can only be separated by turning the heel-section out from the toe-section at about a right angle therewith, as shown in Fig. 3.

The enlarged diameter of the pivot-stud D affords a sufficient bearing and support for a nail, and by inserting a nail centrally through its perforation the same number of nails may be used on each side of the shoe, and the same regular interval be maintained between the nails as in a solid shoe and with manifest advantages.

To make the joint between the sections yet more secure and afford a wider bearing between its parts, a second flange, *o*, may be formed upon the inner side of the tongue G to enter a corresponding recess, *p*, formed in the periphery of the stud D, as shown in Fig. 4.

By preference, calks R R are formed upon the ground face of the shoe at the center of the toe upon the end of each tongue G and upon the heel-sections, so that a calk shall be formed between all the nail-holes excepting the last two at the heel. Heel-calks S S are also formed, as usual, at the extremities of the heel-sections B B, and the shoe is fitted with clips and bar-lugs in the customary manner to complete the same.

It is evident that without departing from our invention the pivotal stud with its nail-hole may be formed on the heel-section to enter a hole in the toe-section instead of as above described, and said modification is illustrated in Figs. 5 and 6 of the drawings.

We claim as our invention—

1. The combination, with a pivoted joint uniting the separable sections of a sectional horseshoe, of a cylindrical stud having a nail-hole pierced through it, and serving as the pivot for the joint, substantially in the manner and for the purpose herein set forth.

2. A cylindrical perforated stud formed near the outer angle of each end of the toe-section of a sectional horseshoe upon its ground side by means of a segmental recess in said face encircling said stud, in combination with a counterpart segmental tongue projecting from the corresponding end of the appropriate heel-section to enter and fill said recess when the two sections are properly adjusted to fit the foot, substantially in the manner and for the purpose herein set forth.

In testimony whereof we have signed our names to this specification in the presence of two subscribing witnesses.

JOHN E. BINGHAM.
EDWARD W. BINGHAM.

Witnesses:
GEORGE W. WARNER,
DAVID K. PECK.